United States Patent
Tomita

(10) Patent No.: US 6,898,669 B2
(45) Date of Patent: May 24, 2005

(54) DISK ARRAY APPARATUS AND DATA BACKUP METHOD USED THEREIN

(75) Inventor: Haruo Tomita, Iruma (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 328 days.

(21) Appl. No.: 10/231,349

(22) Filed: Aug. 30, 2002

(65) Prior Publication Data

US 2003/0115414 A1 Jun. 19, 2003

(30) Foreign Application Priority Data

Dec. 18, 2001 (JP) ........................................ 2001-384821

(51) Int. Cl.⁷ ............................................. G06F 12/00
(52) U.S. Cl. ..................... 711/114; 711/161; 711/162; 711/206; 711/207
(58) Field of Search ................................ 711/206, 207, 711/161, 162, 114

(56) References Cited

U.S. PATENT DOCUMENTS 5,907,672 A * 5/1999 Matze et al.
6,219,752 B1   4/2001 Sekido
6,233,648 B1 * 5/2001 Tomita

FOREIGN PATENT DOCUMENTS

| JP | 62-257649 | 11/1987 |
|----|-----------|---------|
| JP | 10-55298 | 2/1998 |
| JP | 11-120055 | 4/1999 |
| JP | 11-134117 | 5/1999 |
| JP | 11-194899 | 7/1999 |

OTHER PUBLICATIONS

Rosenblum et al., "The Design and Implementation of a Log–Structured File System," ACM Transactions on Computer Systems (Feb. 1992), pp. 1–15.
U.S. Appl. No. 10/231,027, filed Aug. 30, 2002, to Tomita.
U.S. Appl. No. 10/231,157, filed Aug. 30, 2002, to Tomita.
U.S. Appl. No. 10/231,247, filed Aug. 30, 2002, to Tomita.

* cited by examiner

*Primary Examiner*—Jack A. Lane
(74) *Attorney, Agent, or Firm*—Finnegan, Henderson, Farabow, Garrett & Dunner, L.L.P.

(57) ABSTRACT

At the start of a backup operation, the controller of a disk array apparatus makes a copy of an address translation table and searches for a valid logical address based on the copy. From the disk array, the controller reads a physical stripe including a data block of a physical address corresponding to the valid logical address searched for. The controller writes a data block corresponding to a valid logical address included in the read physical stripe in a mass storage device.

14 Claims, 10 Drawing Sheets

| LA# | ST# | BLK# | TS# |
|-----|------|------|------|
| L0 | 100 | 3 | 99 |
| L1 | 1000 | 4 | 999 |
| L2 | 1 | 5 | 21 |
| ⋮ | ⋮ | ⋮ | ⋮ |
| Lm | NULL | NULL | NULL |
| ⋮ | ⋮ | ⋮ | ⋮ |

132

DISK ARRAY APPARATUS AND DATA BACKUP METHOD USED THEREIN

CROSS-REFERENCE TO RELATED APPLICATIONS

This application is based upon and claims the benefit of priority from the prior Japanese Patent Application No. 2001-384821, filed Dec. 18, 2001, the entire contents of which are incorporated herein by reference.

BACKGROUND OF THE INVENTION

1. Field of the Invention

The present invention relates to a disk array apparatus comprising a disk array made up of a plurality of disk drives. More particularly, it relates to a disk array apparatus capable of suitably backing up data recorded in its disk array, and a data backup method used therein.

2. Description of the Related Art

A disk storage management system referred to as log structured file system is known in the art. The log structured file system is described in detail, for example, in Mendel Rosenblum and John K. Ousterhout, "The Design and Implementation of a Log Structured File System", ACM Transaction on Computer Systems, February 1992. The log structured file system described in this document is featured in the following two points: First, updating data called for by a host computer is accumulated, and the accumulated data is collectively written in consecutive areas where valid data is not stored. Second, the area where the data to be replaced with the updating data is stored is invalidated.

On the other hand, U.S. Pat. Nos. 6,219,752 and 6,233,648 disclose the art wherein a log structured file system is applied to a disk array apparatus (the art will be hereinafter referred to as the prior art). In this prior art, an address translation table is used for translating a logical address designated by an access request issued by a host computer into a physical address showing a physical data location in the disk array. It should be noted that logical addresses are data addresses the host computer uses to show data positions in the disk array.

The disk array can deal with a failing disk drive by adopting a redundancy disk configuration known as RAID (Redundant Array of Inexpensive Disks, or Redundant Array of Independent Disks). Only with the redundancy disk configuration, however, it is difficult to reliably protect data from computer viruses or incorrect operations by the operator. In other words, the data may be lost or undesirably altered. To cope with these problems, a copy is regularly made of the data on the disk array and retained in a mass storage device, such as a magnetic tape apparatus or a disk drive, for use in case of emergency. Such a copying operation is referred as image backup. Even if the data on the disk array is lost or altered, the image backup enables the original data (image backup data on the disk array) to be restored on the disk array by use of the backup data in the mass storage device. In this manner, the data on the disk array is restored into its original state.

However, the image backup method, which copies data on the disk array as it is, is disadvantageous in that the time needed for the backup operation depends upon the data capacity of the disk array and lengthens in accordance with an increase in the capacity. Since future disk arrays are expected to have increased capacity, the conventional backup method has problems in this point.

In order to execute efficient data backup, it is thought to alter either the file system or the device driver of the disk array apparatus and to back up only the data that is valid to the system. However, since the disk array apparatus is dependent on the OS (operating system), the method cannot be put to use without adding an interface between the disk array apparatus and the OS. In addition, the internal configurations of the OS and the file system must be publicly known. Furthermore, since disk array apparatuses have to be prepared for different operating systems, the compatibility among the disk array apparatuses of different OS's also becomes a problem.

Jpn. Pat. Appln. KOKAI Publication No. 11-120055 discloses a snapshot preparation method that eliminates the need to alter a file system. In this method, even when data corresponding to one stripe has not been prepared, NULL data is inserted therein, and the resultant 1-stripe data is written in free areas of the disk array. At the time, a time stamp obtained at the time of the snapshot preparation is recorded in an area different from the data area, thus realizing a high-speed snapshot preparation. In this manner, the prior art described in KOKAI Publication No. 11-120055 restricts inputs and outputs to/from the disk array at the time of preparing the snapshot. Hence, the snapshot can be made at high speed. However, it is necessary to reconstruct an address translation table from the recorded time stamp so as to restore data of the disk array by use of the prior art. The time required for the reconstruction of the address translation table depends upon the data capacity of disk array, and lengthens in proportion to that capacity. Therefore, the data restoration method relying on the technology described in KOKAI Publication No. 11-120055 still has problems in view of the fact that future disk arrays are expected to have further increased capacity.

BRIEF SUMMARY OF THE INVENTION

The present invention has been conceived in consideration of the above circumstances, and its object is to provide a disk array apparatus and a data backup method, which can shorten the data backup time by referring to an address translation table and backing up only the data corresponding to valid logical addresses, and which can thereby enable a high-speed backup operation with no need to alter a file system or the disk driver of the disk array apparatus.

A disk array apparatus according to one aspect of the present invention comprises a disk array which is made up of a plurality of disk drives, has a redundancy disk configuration, and is regarded as one logical disk drive by a host computer. In addition to this disk array, the disk array apparatus comprises an address translation table, generating means, searching means, reading means, and writing means (data block writing means). The address translation table includes address translation information for translating logical addresses of valid logical blocks used by the host computer into physical addresses showing where in the disk array those logical blocks are stored. The generating means makes a copy of the address translation table each time the data on the disk array is backed up and recorded in a mass storage device. The searching means searches for a valid logical address in accordance with the copy of the address translation table. If a physical stripe includes a data block whose physical address corresponds to the valid logical address searched for by the searching means, the reading means reads such a physical stripe from the disk array. The writing means writes the data block corresponding to the valid logical address which is included in the physical stripe read by the reading means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
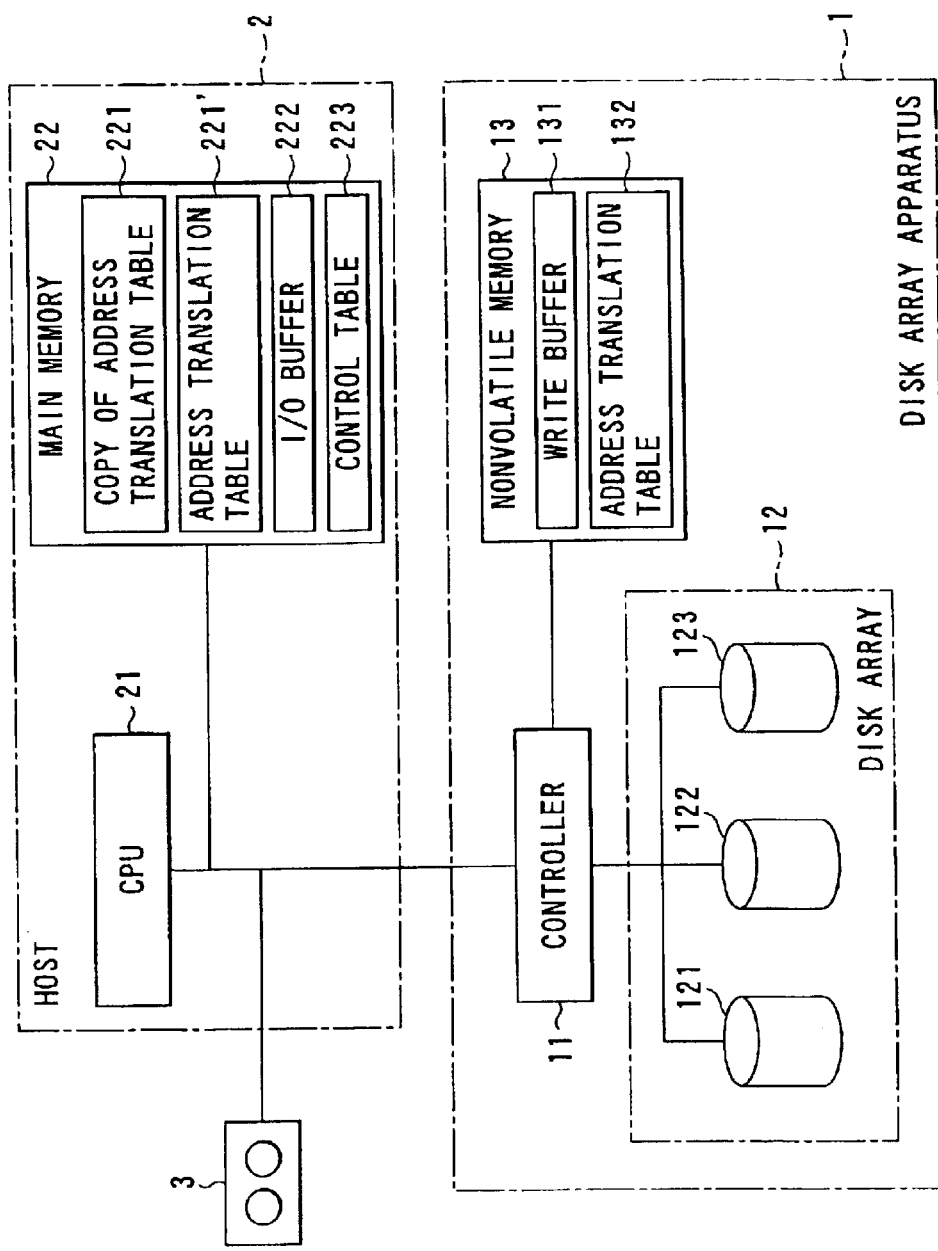
FIG. 1 is a block diagram showing the configuration of a computer system comprising a disk array apparatus according to one embodiment of the present invention.

A preferred embodiment of the present invention will now be described with reference to the drawings. FIG. 1 is a block diagram which shows the configuration of a computer system comprising a disk array apparatus according to one embodiment of the present invention. The computer system shown in FIG. 1 comprises a disk array apparatus 1, a host 2 and a mass storage device 3. This mass storage device 3 is used to back up the data stored in the disk array 12 (described later) of the disk array apparatus 1. As the mass storage device 3, a storage device such as a magnetic tape apparatus or a disk drive can be employed. In the embodiment, the mass storage device 3 is a magnetic tape apparatus. The disk array apparatus 1 comprises a controller 11, the disk array 12 and a nonvolatile memory 13. The disk array 12 and the nonvolatile memory 13 are connected to the controller 11. The disk array 2 includes a plurality of disk drives, for example, three disk drives 121, 122 and 123. The nonvolatile memory 13 may be replaced with a memory device made up of a volatile memory and a memory backup mechanism. The memory backup mechanism prevents data in the volatile memory from being lost when the power supply is turned off. The memory backup mechanism is battery, for example.

The host 2 is a computer using the disk array 12 of the disk array apparatus 1. From this host 2, the disk array 12 of the disk array apparatus 1 looks as one logical disk drive. The host 2 comprises a CPU 21 and a main memory 22. CPU 21 serves as the nerve center of the host 2. The main memory 22 stores an OS (operating system) and application programs of various kinds.

Figure 2:
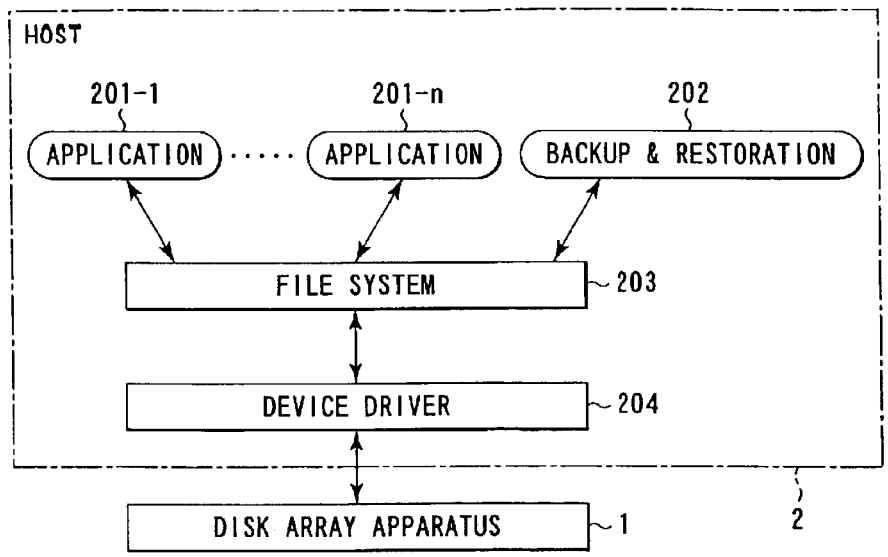
FIG. 2 is a block diagram showing a software structure related to the disk array apparatus 1 of the host 2 depicted in FIG. 1.

FIG. 2 is a block diagram showing a software structure used by the disk array apparatus 1 of the host 2 shown in FIG. 1. In FIG. 2, application programs 201-1 to 201-n are programs based on which the disk array apparatus 1 operates. A backup & restoration program 202 is a program used for backing up the data of (the disk array of) the disk array apparatus 1 in the mass storage device 3 and for restoring data in the disk array apparatus 1 by use of the data backed up in the storage device 3. A request made from one of the application programs 201-1 to 201-n and the backup & restoration program 202 is sent to the disk array apparatus 1 via a file system 203 and a device driver 204 of the disk array apparatus 1. In response to this request, the disk array apparatus 1 is accessed.

The present embodiment will be described based mainly on the configurations shown in FIGS. 1 and 2. However, those skilled in the art could easily apply the present invention to computer systems of other configurations, such as a computer system having a configuration derived from what is shown in FIGS. 1 and 2, without having to be informed of details of such computer systems.

Before a detailed description of the configuration in FIG. 1 is given, key terms used in the description of the embodiment will be explained.

a) Logical Block

A logical block is a data block looked at from the host 2. More specifically, it is a data block which is in a logical disk area of the disk array 12.

b) Physical Block

A physical block is a block which is physical in the literal sense of the word, and is on the disk array 12. More specifically, it is a data block which is in a physical disk area of the disk array 12. The size of the data block is fixedly determined beforehand.

c) Logical Address

A logical address is a data address used by the host 2 to show where on the disk array 12 data is stored. The logical address is used as representing where a data block exists in the logical disk area of the disk array 12. That is, the logical address is used as a logical block address indicating the position of the logical block.

d) Physical Address

A physical address is used to show a physical location of data (a data block) on the disk array 12. The physical address is a physical block address showing the physical location of a data block on the disk array 12. That is, the physical address is a physical block address of a physical block. The physical address is defined by a physical stripe number and a physical block number, which will be described later.

e) Logical Address Tag

A logical address tag includes a logical address and a time stamp corresponding to each logical block.

f) Parity Block

A parity block is a data block made up of redundant data corresponding to a plurality of logical blocks.

g) Logical Address Tag Block

A logical address tag block is a data block including a logical address tag.

h) Logical Block Number

A logical block number is used by the host 2 and specifies a data block on the disk array 12.

i) Physical Block Number

A physical block number is a number showing a relative position of a data block in a physical stripe of the disk array 12. The physical block number is unique to each disk drive of the disk array 12.

A write buffer 131 and an address translation table 132 are arranged in the nonvolatile memory 13 of the disk array apparatus 1. The write buffer 131 is used for retaining data to be written in the disk array 12 as data of log structures. The address translation table 132 is a translation map used for translating a logical address (a logical block address) into a physical address (a physical block address). By this address translation table 132, a data address (data block address) the host 20 uses to designate an area on the disk array 12 is translated into a physical address indicating where on the disk array 12 physical data (a data block) is stored. In short, a logical address is translated into a physical address based on the address translation table 132.

The controller 11 is a disk array controller for controlling the disk array 12. The controller 11 controls the access to the disk array 12 and other operations on the basis of a control program stored in a ROM beforehand. In addition, the controller 11 manages the write buffer 131 and the address translation table 132 on the basis of the control program. The controller 11 is connected to the host 2. A SCSI (Small Computer System Interface) or PCI bus (Peripheral Component Interconnect Bus) can be used as the interface between the host 20 and the controller 1.

Each of the disk drives 121–123 of the disk array 12 writes data in an amount K times larger than the size of one data block (block size) (K: an integer greater than 0). In other words, each disk drive writes data in units of K blocks. At the time, each of the K blocks of the disk drives 121–123, which correspond to the same physical positions of the disk drives 121–123, is treated as a stripe segment of one physical stripe, so that data is written in the K blocks at the same timing. In the present embodiment wherein the disk array 2 includes three disk drives 121–123, one stripe comprises three stripe segments. Let us assume that the disk array 2 comprises N disk drives (N is an integer greater than 2 and is equal to 3 in the case of the embodiment shown in FIG. 1) and that the size of one stripe segment is K blocks. In this case, one stripe is made up of (N×K) data blocks. The number of logical blocks included in one stripe (i.e., the number of logical blocks corresponding to one stripe) is (N×K) where the disk array 12 is used at RAID levels that do not require generation of parity data. Examples of such RAID levels are RAID0, RAID1 and RAID10. The number of logical blocks corresponding to one stripe is (N−1)×K where the disk array 12 is used at RAID levels that require generation of parity data. Examples of such RAID levels are RAID4, RAID5 and RAID50. Preferably, the size of a stripe segment (i.e., the number of blocks included in the stripe segment) should be approximate to the size determined by the one-track length of a disk drive, so as to ensure high access efficiency for that disk drive.

The disk array 12 is of a redundancy disk configuration, so that even if one of the disk drives 121, 122 and 123 fails, the data in the failing disk drive can be regenerated (recovered). For the sake of simplicity, it is assumed that disk array 12 has a redundancy disk configuration of RAID 4. A predetermined one of the disk drives 121–123, e.g., disk drive 123, is used as a parity disk drive that stores parity data.

The controller 11 uses a high-speed write method similar to that described in the prior art documents (namely, U.S. Pat. Nos. 6,233,648, 6,219,752 or 6,233,648). In response to an update (write) request from the host, the controller 11 accumulates updating data in the write buffer 131, instead of rewriting the contents in the corresponding area of the disk array 12. To be more specific, the controller 11 divides the updating data into blocks and records them in free areas of the write buffer with high density. The write buffer 131 has a memory capacity defined by (1 stripe−1 stripe segment), i.e., a memory capacity corresponding to (N−1)×K data blocks.

The controller 11 generates a logical address tag block when the number of data blocks (logical blocks) written in the write buffer 131 has become the number determined by (1 stripe−[1 stripe segment+1 data block]). This logical address tag block comprises a logical address tag and a time stamp. The controller 11 stores the generated logical address tag block in the last-block location of the write buffer 131. Then, the controller 11 generates parity data corresponding to 1 stripe segment (i.e., K parity blocks) from data stored in the write buffer 131 and corresponding to (1 stripe−1 stripe segment) (i.e., [N−1]×K data blocks). The data stored in the write buffer 131 includes the generated logical address tag block. Subsequently, the controller 11 starts collectively writing the 1-stripe data in the disk array 12. The 1-stripe data includes data corresponding to (1 stripe−1 stripe segment) and the generated parity data corresponding to 1 stripe segment. In the write operation, the 1-stripe data is written in physically consecutive areas of a free space of the disk drives in accordance with the striping rule corresponding to the number N of disk drives constituting the disk array 12. In the embodiment shown in FIG. 1, N is 3, so that three disk drives 21–23 are employed. The physically consecutive areas are areas different from an area where the data to be updated is stored.

Figure 3:
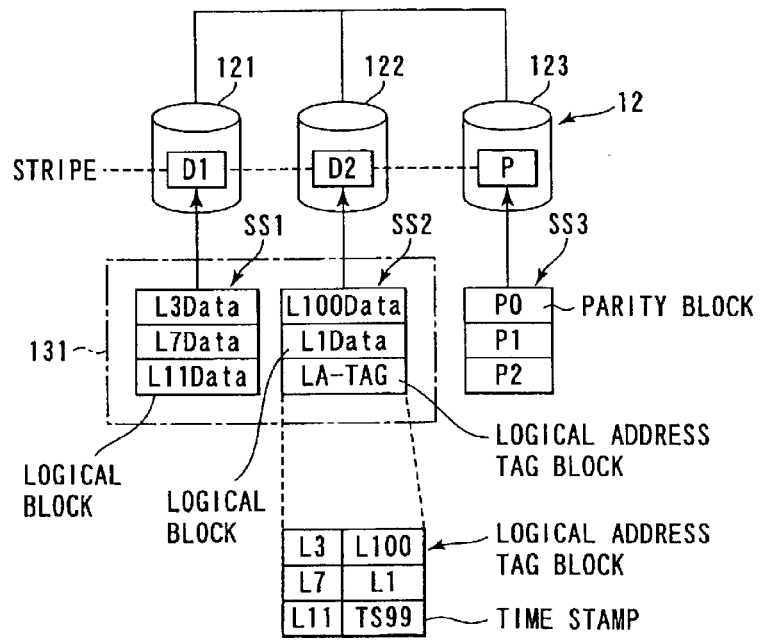
FIG. 3 shows an example of 1-stripe data, and also illustrates how the 1-stripe data is written in the disk drives 121, 122 and 123 of the disk array 12.

FIG. 3 shows an example of 1-stripe data the controller 11 prepares (K=3) and illustrates how the 1-stripe data is written in the disk drives 121–123 of the disk array 12. In the example shown in FIG. 3, three stripe segments SS1, SS2 and SS3 are collectively written in the free areas of the disk drives 121, 122 and 123 as data D1, data D2 and data P, respectively. Data D1, data D2 and data P constitute one stripe. Stripe segment SS1 includes logical blocks (L3Data, L7Data and L11Data) corresponding to logical addresses L3, L7 and L11. Stripe segment SS2 includes logical blocks (L100Data and L1Data) corresponding to logical addresses L100 and L1, and a logical address tag block (LA-TAG). Stripe segment SS3 includes parity blocks P0, P1 and P2. Parity block P0 is a parity block corresponding to the logical blocks of logical addresses L3 and L100. Parity block P1 is a parity block corresponding to the logical blocks of logical addresses L7 and L1. Parity block P2 is a parity block corresponding to the logical block of logical address L11 and a logical address tag block (LA-TAG). In this example, parity block P0 is generated by obtaining an exclusive OR (XOR) between the logical blocks of logical addresses L3 and L100. Likewise, parity block P1 is generated by obtaining an exclusive OR (XOR) between the logical blocks of logical addresses L7 and L1, and parity block P2 is generated by obtaining an exclusive OR (XOR) between the logical block of logical address L11 and the logical address tag block.

Figures 4, 5:
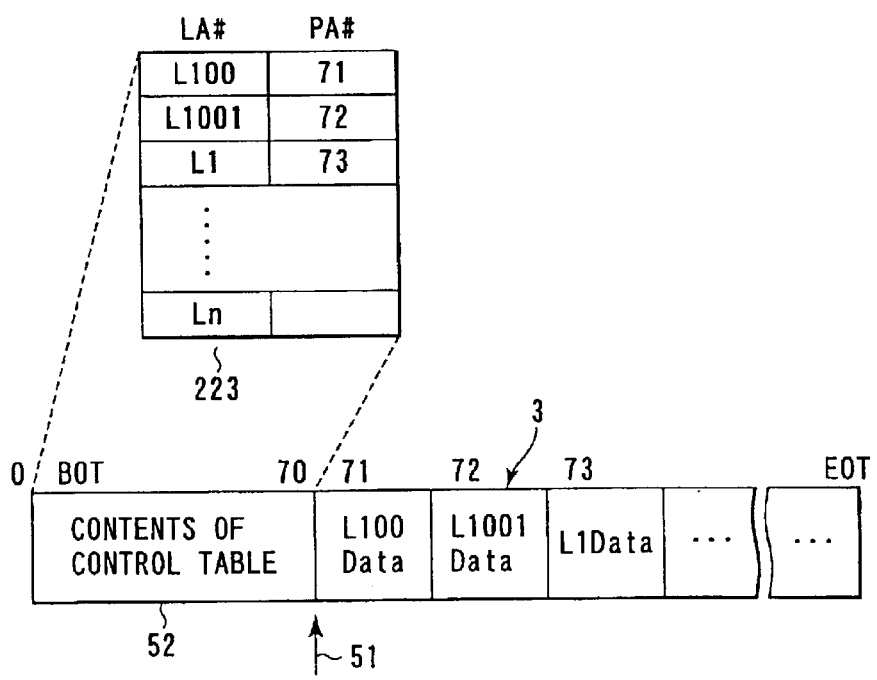
FIG. 4 shows an example of the data structure of the address translation table 132 shown in FIG. 1.
FIG. 5 illustrates how contents of a control table 223 and the data of the disk array 12 are backed up in the mass storage device 3 depicted in FIG. 1.

FIG. 4 shows an example of a data structure of the address translation table 132. In the example shown in FIG. 4, each entry of the address translation table 132 corresponds to its own logical address. For efficient reference to the address translation table 132, an i-th entry of the table 132 is correlated with logical address i (a logical address of logical block i). The number of entries included in the address translation table 132 is equal to the total number of logical addresses used by the host 2. Information on the entries of the address translation table 132 (address translation information) includes fields, such as a logical address (logical block address) LA#, a physical stripe number ST#, a physical block number BLK#, and a time stamp TS#. The physical stripe number ST# indicates a physical stripe including a physical block which is assigned with a logical block specified by the corresponding logical address (logical block address) LA# and which is present (in the physical disk area) on the disk array 2. The physical block number BLK# indicates a relative position showing where the physical block is in the physical stripe specified by the physical stripe number ST#. Time stamp TS# is information used for managing the order in which data blocks of the corresponding logical addresses LA # are written in the disk array 2. Where the i-th entry (entry i) of the address translation table 132 is correlated with logical address i, as in the present embodiment, the i-th entry can be referred to based on the logical address i. It follows from this that the field for the logical address is not necessarily required. In an address translation table used in a modification described below, however, a logical address field has to be prepared for each entry.

In the initial state in which the address translation table 132 has just been arranged (created) in the nonvolatile memory 3, valid data is set only in the logical address field of each of the entries of the table 132. "NULL" is set in the other fields of each entry. Where "NULL" is set in the fields other than the logical address field, the corresponding logical address indicates an invalid logical block not used by the host 2. In the example shown in FIG. 4, logical address Lm indicates such an invalid logical block. Where data different from "NULL" is set in the fields other than the logical address field, the corresponding logical addresses indicate valid logical blocks used by the host 20. In the example shown in FIG. 4, logical addresses L0, L1 and L2 indicate such valid logical blocks. In the descriptions below, expressions such as "invalid logical address", "valid logical address", "logical address is valid" and "logical address is invalid" will be used for the sake of simplicity.

When 1-stripe data is written in the disk drives 121, 122, and 123 of the disk array 12, the controller 11 updates the address translation information specified by the logical addresses of the logical blocks of the stripe and set in the entries of the address translation table 132. The address translation information is updated for each of the logical blocks. In other words, the controller 11 updates the physical stripe number and physical block number included in the address translation information in such a manner that they represent a physical data location where the corresponding logical block is actually written in the disk array 12. In addition, the controller 11 updates a time stamp included in the address translation information. When a read or write request issued by the host 2 is executed, the controller 11 refers to the entry which is included in the address translation table 132 and which corresponds to the logical address Li designated by the request. Based on this, a logical address Li can be easily translated into a physical address made up of a physical stripe number and a physical block number.

The main memory 22 in FIG. 1 contains a copy 221 of the address translation table, an I/O (input and output) buffer 222, and a control table 223. The copy 221 is made by copying the address translation table 132 and keeping the copied table in the main memory 22. The copy 221 is produced when the controller receives a backup start request based on the backup & restoration program 202 and all data accumulated in the write buffer 131 is written in the disk array 12. The I/O buffer 222 is used when data is transferred from the disk array 12 to the mass storage device 3 (backup) and when data is transferred from the mass storage device 3 to the disk array (restoration). The control table 223 used for managing the data transferred from the disk array 12 and backed up in the mass storage device 3.

FIG. 5 shows how the contents of the control table 223 and data on the disk array 12 are backed up in the mass storage device 3 depicted in FIG. 1. Control information is stored in each entry of the control table 223. As shown in FIG. 5, the control information includes pairs of logical addresses LA# and physical addresses PA#. The logical addresses LA# included in the control information specify where in the disk array 12 logical blocks backed up by the mass storage device 3 are stored. The physical addresses PA# included in the control information are physical block addresses and specify where in the mass storage device 3 the logical blocks are backed up. (The logical blocks are designated by the logical addresses that form pairs with the physical addresses PA#.) The number of entries in the control table 223 agrees with the number of entries included in the copy 221 of the address translation table. In FIG. 5, the contents of the control table 223 are also illustrated as being backed up in the mass storage device 3.

In the present embodiment, only valid data blocks on the disk array 12 are backed up in the mass storage device 3. Information on the entries of the control table 223 (control information) is generated each time valid data blocks of the disk array 12 are stored in the I/O buffer 222 in an amount corresponding to one stripe. Consecutive physical addresses (physical block addresses) PA# beginning with the first entry of the control table 223 are consecutive physical addresses which start at the reference point 51 of the mass storage device 3. In other words, the valid data block on the disk array 12 is written in the physically consecutive areas beginning at the reference point 51 of the mass storage device 3. The size from the starting position of the mass storage device 3 (the location of physical block "0") to the reference point 51 is equal to the size of the control table 223, which is determined by the number of entries included in the copy 221 of the address translation table. The starting position of the mass storage device 3 is the beginning of tape BOT in the present embodiment wherein the storage device 3 is a magnetic tape apparatus. When the backup of data from the disk array 12 to the mass storage device 3 is completed, the contents of the control table 223 which is then generated in the mass storage device 3 are written in the head area 52 of the mass storage device 3 (the head area starts at the starting position of the mass storage device and ends at the position immediately preceding the reference point 51). In the descriptions below, the contents of the control table 223 written in area 52 may be referred to as "control table information." In the example shown in FIG. 5, area 52 is an area from physical block "0" to physical block "70." Valid data on the disk array 12 is stored in the succeeding area of the mass storage device 3. In the example shown in FIG. 5, the succeeding area is an area starting at physical block "71", which is the reference point. In the present embodiment, it is assumed for the sake of simplicity that the block size of the disk array 12 and the block size of the mass storage device 3 are equal to each other. Needless to say, however, the present invention is easily applicable to the case where the two kinds of the block sizes differ from each other. Furthermore, the checksum of all recorded information may be recorded so as to confirm whether or not data has been reliably recorded in the mass storage device 3.

Let us assume that a high-speed write method similar to those described in the prior art documents is applied to the disk array apparatus 1 shown in FIG. 1. If, in this case, the disk array is accessed frequently, it may not have a free area. To avoid this problem, the disk array 1 must be provided with consecutive areas in which no valid data is recorded and which is required for the write operation. To attain this, only the valid data blocks corresponding to at least one physical stripe must be rearranged on at least one different physical stripe in such a way as to provide required consecutive free areas. This processing is referred to as segment cleaning. Details of segment cleaning are described in U.S. Pat. No. 6,219,752.

Figure 6:
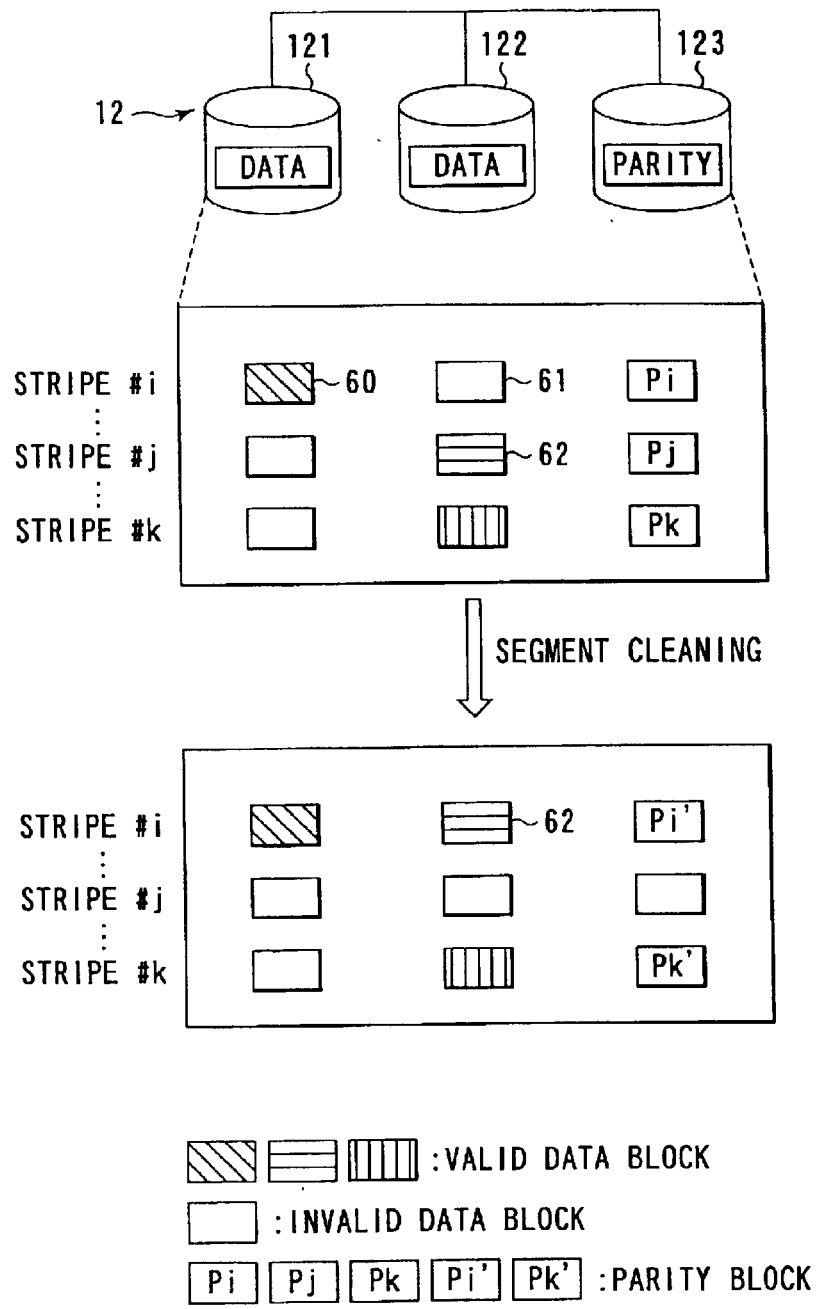
FIG. 6 shows an example of segment cleaning.

FIG. 6 shows an example of segment cleaning. In this example, valid data block 62 included in stripe #j is rearranged in such a manner that it is stored in disk drive 122 at a position corresponding to stripe #i in place of the invalid data block 61. As a result, stripe #j is reserved as free areas (free stripe). In this case, new parity block Pi' is generated in such a manner as to follow data blocks 60 and 62 which are included in stripe #i. In this manner, original parity block Pi is updated with new parity block #Pi'.

Figure 7A:
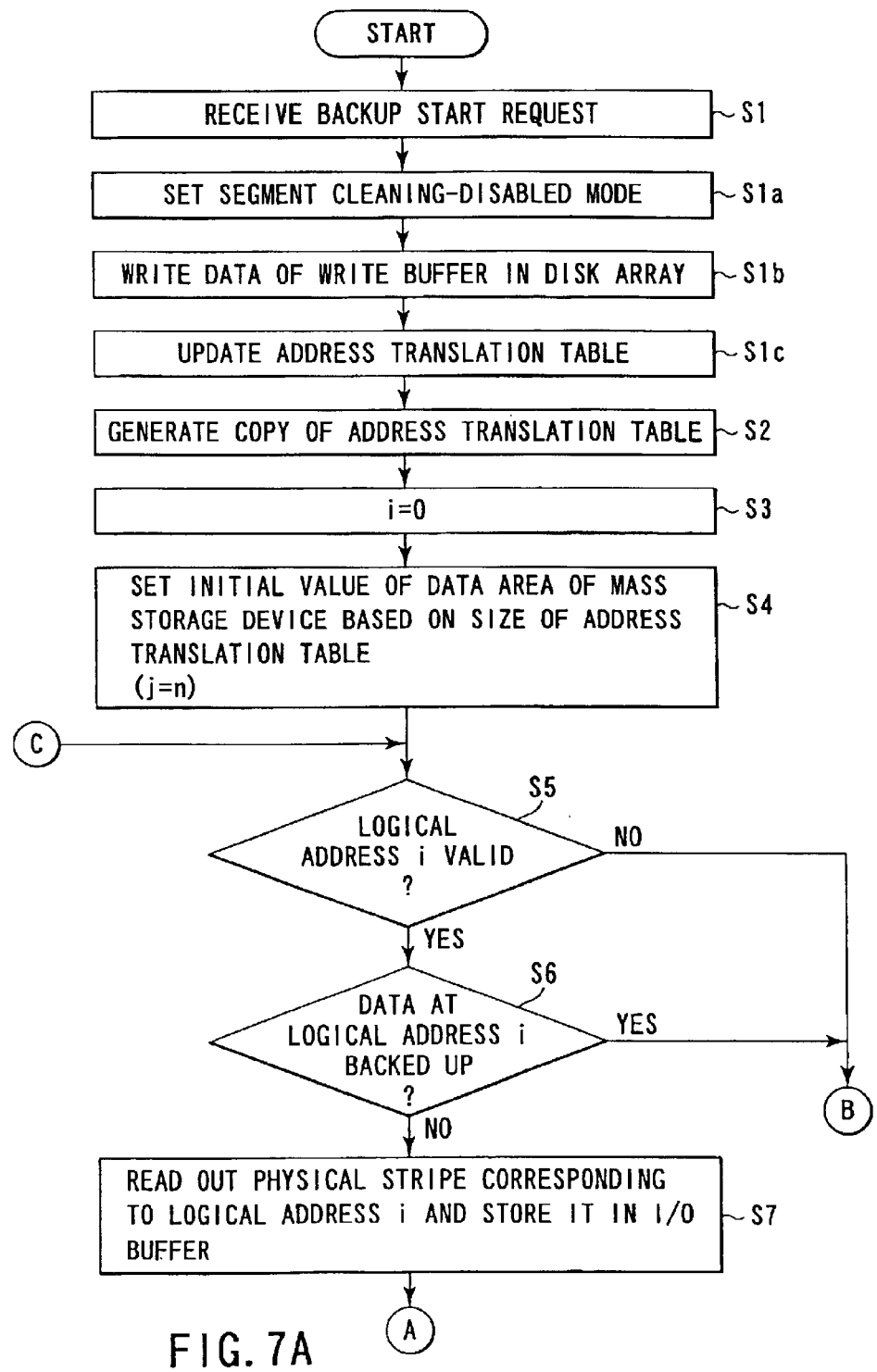
FIGS. 7A to 7C show a flowchart illustrating the backup operation performed according to the embodiment.
Figure 7B:
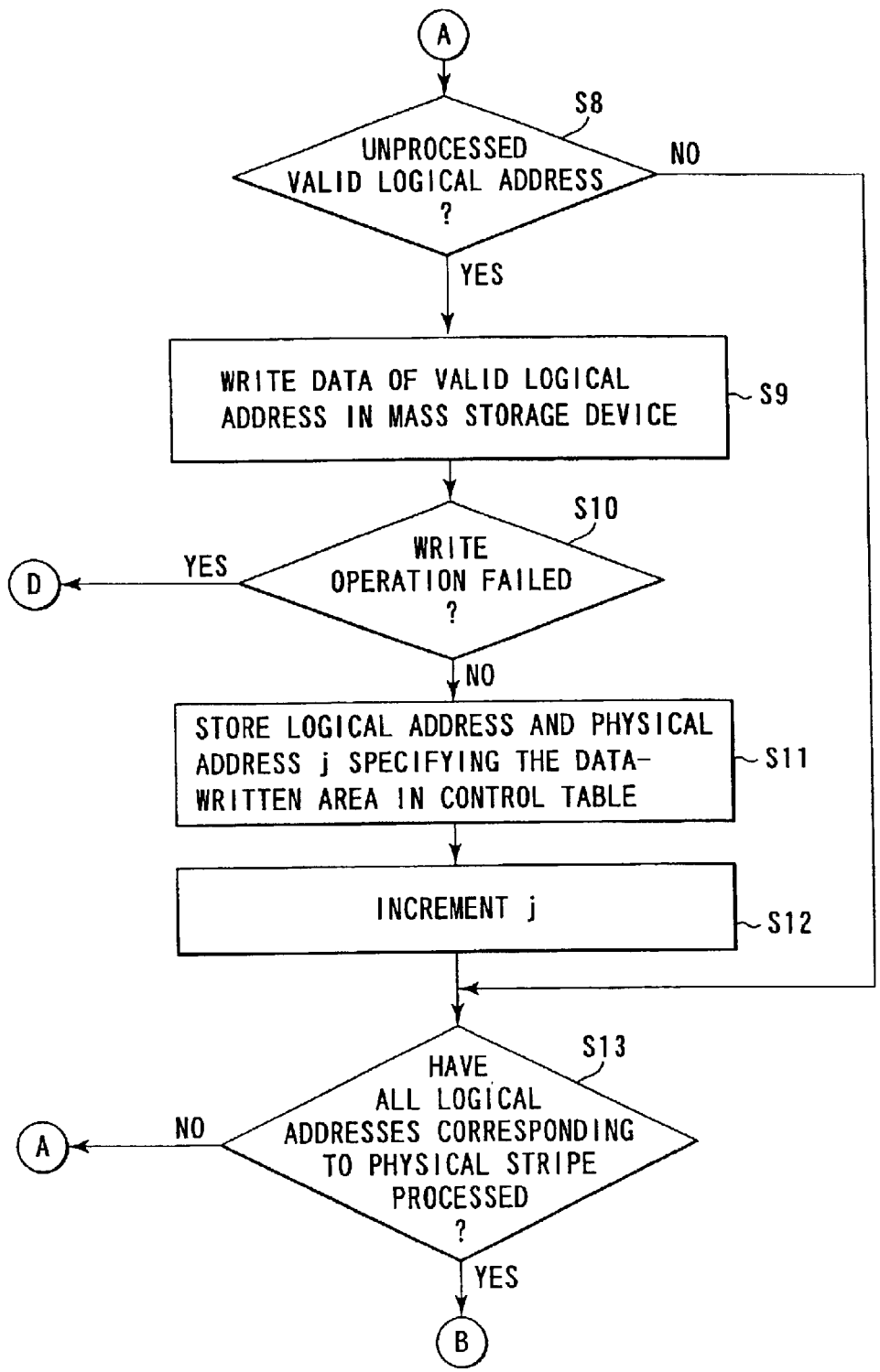

A backup operation, in which the data of the disk array 12 is backed up in the mass storage device 3 in accordance with the present embodiment, will be described, referring to the flowchart shown in FIGS. 7A to 7C. First of all, the CPU 21 of the host 2 executes the backup & restoration program 202, and a backup start request is issued based on the program 202. The backup start request based on the backup & restoration program 202 can be realized as an I/O control request sent to the device driver 204, which controls the disk array apparatus 1. In response to the backup start request based on the backup & restoration program 202, the device driver 204 transmits a corresponding backup start request to the disk array apparatus 1. The device driver 204 can easily notify the disk array apparatus 1 of the backup start request by transmitting a command based on the SCSI standard, for example, a "Mode Select" command.

The controller 11 of the disk array apparatus 1 receives the backup start request from the device driver 204 (Step S1). In response to this, the controller 11 sets a segment cleaning-disabled state and records the information on this state in a predetermined area of the nonvolatile memory 13 (Step S1a). In other words, the controller 11 sets a segment cleaning-disabled mode. Thereafter, the controller 11 writes in the disk array 12 all data that has been accumulated in the write buffer 131 of the nonvolatile memory 13 up to the time (Step S1b). Then, the controller 11 updates the address translation table 132 of the nonvolatile memory 13 in accordance with the data write operation (Step S1c). The controller 11 copies the updated address translation table 132 and keeps it in the main memory 22 of the host 2, thereby generating a copy 221 of the address translation table (Step S2). The controller 11 sets logical address i, which specifies which data on the disk array 12 is to be backed up, at initial value "0" (Step S3).

Then, the controller 11 determines the physical address n of the reference point 51 (FIG. 5) of the area (data area) in which the backup data in the mass storage device 3 is to be recorded, and sets that physical address n as an initial value of physical address j at which backup is started (Step S4). It should be noted that the physical address n (physical block n) is determined based on the size of the control table 223 (the number of blocks). The size of this control table 223 is calculated based on the number of entries included in the copy 221 of the address translation table. The size of the control table 223 represents the size between the starting position (BOT) of the mass storage device 3 (FIG. 5) and the reference point 51, i.e., the size of the area 52 in which the contents of the control table 223 (control table information) are stored.

Then, the controller 11 refers to an entry included in the copy 221 of the address translation table and corresponding to logical address i and determines whether or not logical address i is valid (Step S5). If logical address i is valid ("YES" in Step S5), the controller 11 determines whether or not the data at logical address i has been backed up (Step S6). This determination is made by referring to the control table 223 on the main memory 22, using logical address i as a key. To be more specific, the determination is made by checking whether or not the control table 223 contains control information including logical address i.

If the data at logical address i has not yet been backed up, ("NO" in Step S6), the controller 11 carries out Step S7 as follows: In Step S7, the controller 11 translates a logical address i into a physical address made up of a physical stripe number and a physical block number, by referring to the copy 221 of the address translation table. In Step S7, moreover, the controller 11 executes I/O processing, wherein it reads from the disk array 12 the physical stripe designated by the physical address corresponding to logical address i and transfers the read physical stripe to the I/O buffer 222 of the main memory 22. In this manner, the operation of reading the physical stripe from the disk array 12 to the I/O buffer 222 for data backup is executed as I/O processing using the copy 221 of the address translation table.

After reading the physical stripe, the controller 11 determines whether or not an unprocessed valid logical address is included in the logical addresses that specify logical blocks included in the read physical stripe (Step S8). For this determination, the copy 221 of the address translation table is searched for valid logical addresses by using the physical stripe numbers of the read physical stripe. This search operation is performed in the order of entries, for example. Alternatively, flags showing the processed/unprocessed state of logical addresses may be attached to the entries in the copy 221 of the address translation table. In this case, the determination mentioned above is made by referring to the flags when the valid logical addresses are searched for.

If an unprocessed valid logical address exists ("YES" in Step S8), the controller 11 reads out data on the logical block corresponding to the logical address from the I/O buffer 222, and writes that data in the mass storage device 3 at the block position specified by physical address j (Step S9). Then, the controller 11 determines whether the write operation for the mass storage device 3 results in failure (Step S10). If the write operation for the mass storage device 3 has been successfully completed ("NO" in Step S10), the controller 11 stores the resultant control information in a free entry of the control table 223 (Step S11). The control information includes a logical address of the logical block for which the write (backup) operation has been successfully completed, and a physical address j specifying the data-written area and forming a pair with the logical address. The entry number (the initial value of which is "0") of a free entry into which data is recorded in Step S11 is incremented by 1 each time Step S11 is executed.

Next, the controller 11 increments j by 1 (Step S12). In addition, the controller 11 determines whether or not logical-addresses processing has been executed with respect to all logical blocks included in the physical stripe read in Step S7 (Step S13). If processing for all logical addresses corresponding to the physical stripe read in Step S7 is done ("YES" in Step S13), the controller 11 increments logical address i by 1 in order to specify the logical address that should be processed next (Step S14). The controller 11 refers to the copy 221 of the address translation table on the basis of the incremented logical address i, thereby determining whether or not processing for all logical addresses has been completed (Step S15).

If the processing for all logical addresses registered in the copy 221 of the address translation table is completed ("YES" in Step S15), the controller 11 issues a backup termination notice (Step S16). This backup termination notice can be easily realized as a hardware interrupt to the device driver 204. Upon receipt of the backup termination notice from the controller 11, the device driver 204 transmits the corresponding backup termination notice to the backup & restoration program 202. The termination notice from the device driver 204 to the backup & restoration program 202 can be easily realized as a notice that indicates the termination of the processing for the I/O control request received from the device driver 20 for backup start.

After issuing a backup termination notice to the device driver 204, the controller 11 of the disk array apparatus 1 clears the information stored in the nonvolatile memory 3 and representing a segment cleaning-disabled state (Step S16a). In other words, the controller 11 cancels the segment cleaning-disabled mode. Then, the controller 11 determines whether or not the backup has ended in success (Step S17). If the backup has ended in success, the contents of the control table 223 which is then retained in the main memory 22 are written in the mass storage device 3 from the start position (Step S18).

On the other hand, if the determination made in Step S5 is "NO" or the determination made in Step S6 is "YES", the controller 11 advances to Step S14 to designate a logical address to be processed next. If the determination made in Step S8 is "NO", the controller 11 advances to Step S13 so as to examine whether processing has been executed for all logical addresses corresponding to the physical stripe that is being processed. If the determination in Step S10 is "YES", the controller 11 advances to Step S16 to bring the backup to an end. If the determination in Step S13 is "NO", the controller 11 returns to Step S8 to process the remaining logical addresses.

As described above, the backup operation according to the present embodiment makes use of the address translation table to search for valid logical addresses. Of the data stored in the disk array, only the data corresponding to the valid logical addresses can be backed up. In comparison with the prior art which backs up the data in the disk array as it is, the present embodiment can shorten the time needed for data copying (data backup). Therefore, the present embodiment has enabled a high-speed backup operation without any alterations to the file system or the device driver of the disk array apparatus.

In the backup operation described above, the segment cleaning-disabled mode is set during the backup operation period, so that segment cleaning on the disk array 12 is disabled. This is intended to prevent segment cleaning from being executed with respect to the physical stripe for which the backup operation has not yet been completed. It should be noted that disabling the segment cleaning leads to failure to secure new free areas during the backup operation. This being so, it is likely that a write request from the host 2 cannot be met during the backup operation period. In other words, it is hard for the present embodiment to execute an on-line backup operation, i.e., to execute the processing for meeting an I/O request (particularly, a write request) and simultaneously execute a backup operation. It may be thought to manage physical stripes that have been backed up, so that the segment cleaning-disabled state can be canceled for such physical stripes. In the backup operation according to the embodiment, however, physical stripes are processed in the order of corresponding logical addresses, and only the data corresponding to the valid logical addresses included in the physical stripes is backed up. Naturally, therefore, the order in which the physical stripes are backed up is determined at random. This being so, it is not easy to manage the physical stripes that have been backed up.

Figure 8A:
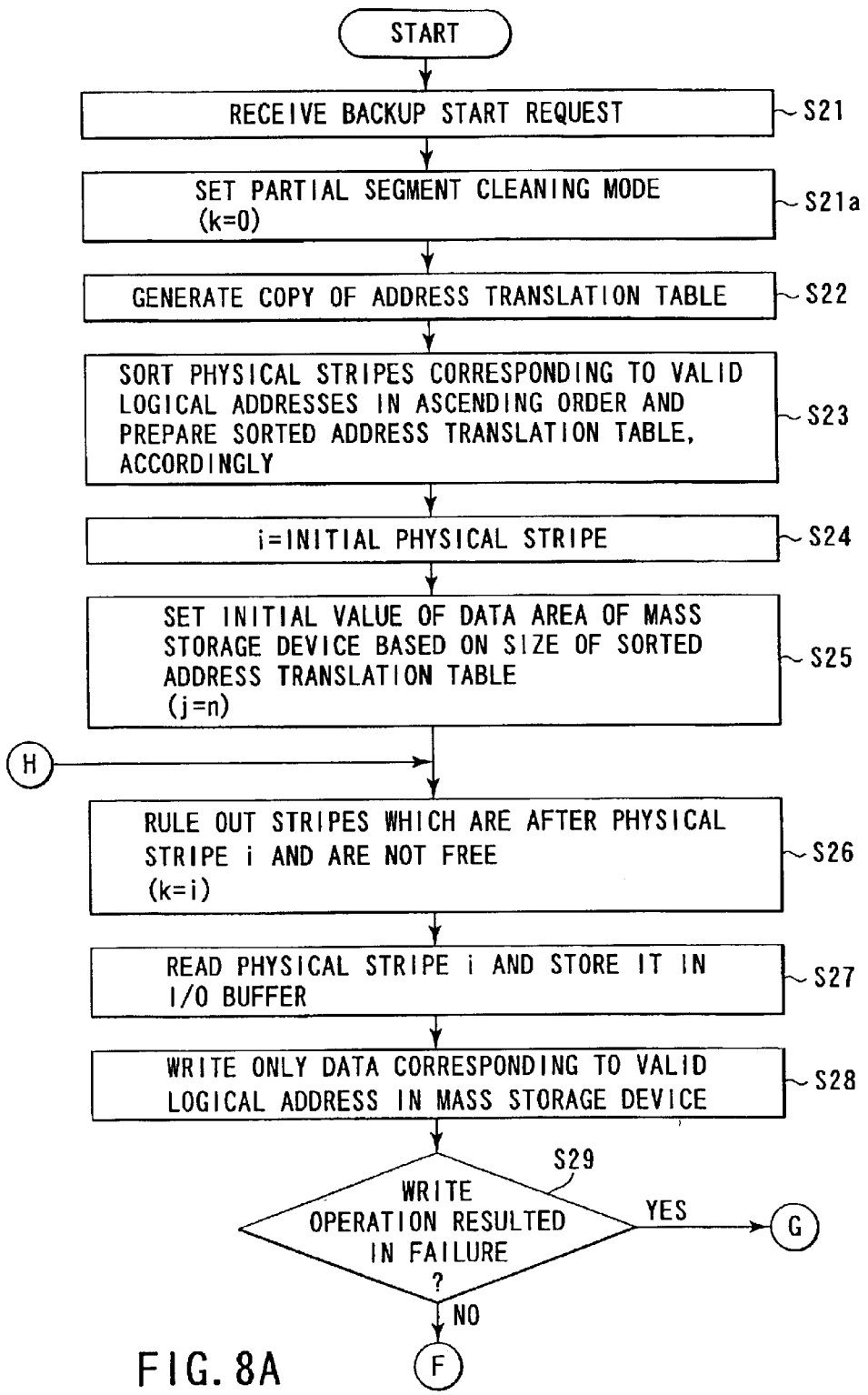
FIGS. 8A and 8B show a flowchart illustrating the backup operation performed according to a modification of the embodiment.
Figure 8B:
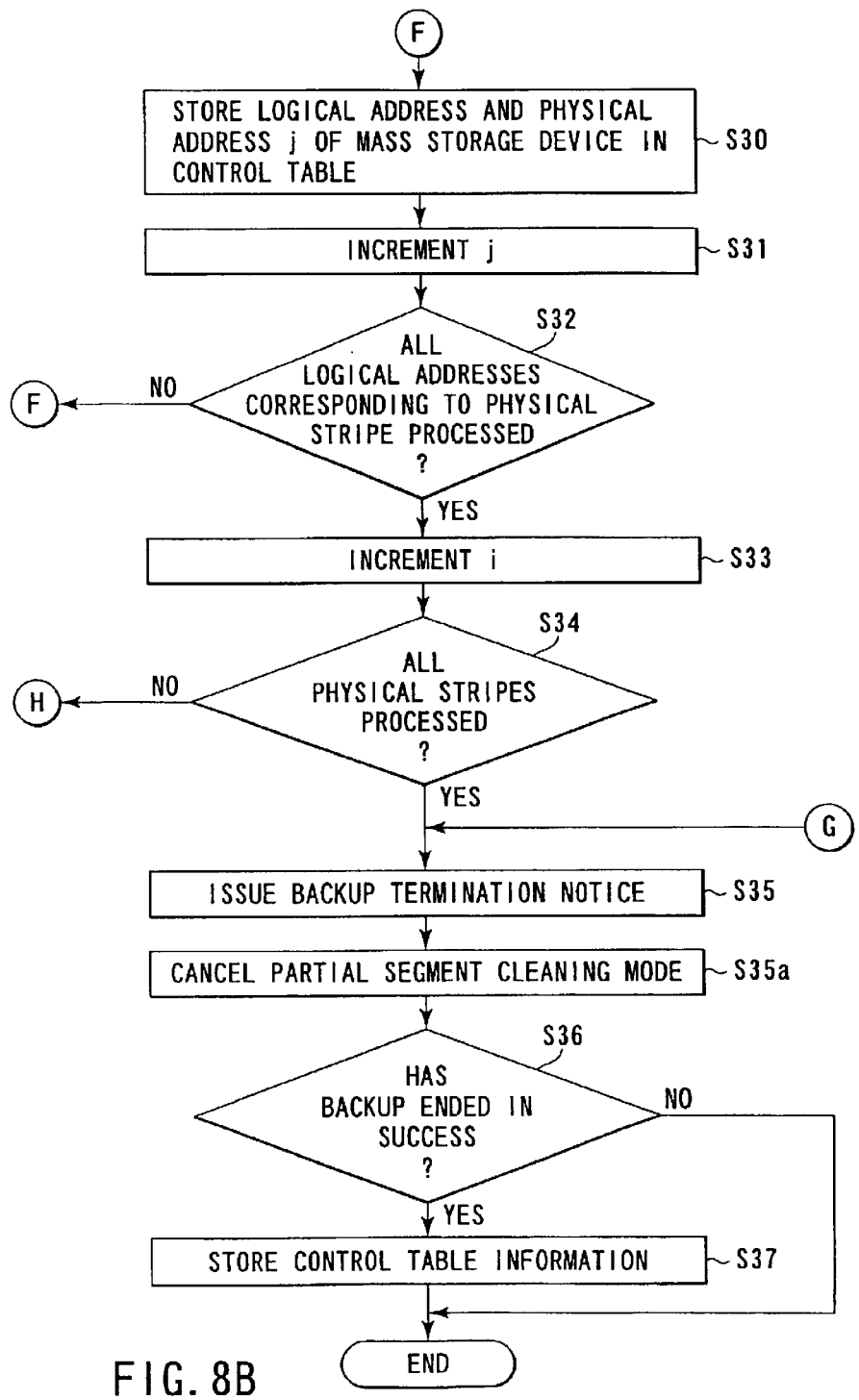

A modification of the embodiment will now be describe with reference to the flowchart shown in FIGS. 8A and 8B. The modification enables an on-line backup operation and realizes easy management of both physical stripes that have been backed up and physical stripes that have not yet been backed up. Let us assume that the device driver 204 transmits a backup start request, issued based on the backup & restoration program 202, to the disk array apparatus 1. Upon receipt of the backup start request from the device driver 204 (Step S21), the controller 11 of the disk array apparatus 1 executes Step S21a. Specifically, the controller 11 sets initial value "0" as physical stripe number k indicating the first one of the physical stripes for which segment cleaning is not performed. The initial value is stored in a predetermined area of the nonvolatile memory 13. In other words, the controller 11 selects a partial segment cleaning mode in which partial segment cleaning can be designated. In addition, the controller 11 designates physical stripe "0" as the first one of the physical stripes for which segment cleaning is not performed. In this case, all the physical stripes on the disk array 12 are temporarily excluded from the physical stripes for which segment cleaning is performed. That is, the disk array 12 is temporarily set in the segment cleaning-disabled state. Normally, segment cleaning processing uses such algorithms as described above in order to select physical stripes for which segment cleaning should be performed. According to the modification of the embodiment, in contrast, only those physical stripes having physical stripe numbers smaller than the physical stripe number k recorded in the predetermined area of the nonvolatile memory 13 are subjected to segment cleaning. As described below, a group of consecutive physical stripe numbers beginning with physical stripe number k have not yet been backed up. Therefore, data that has not yet been backed up can be protected by selecting only those physical stripes having smaller physical stripe numbers than physical stripe number k as physical stripes that must be subjected to segment cleaning.

After executing Step S21a, the controller 11 executes processing similar to that of Steps S1b and S1c (Steps S21b and S21c). Then, the controller 11 copies the address translation table 132 and keeps this copy in the main memory 22 of the host 2, thus generating a copy 221 of the address translation table (Step S22). Subsequently, the controller 11 sorts entry information of the copy 221 of the address translation table (address translation information) in a predetermined order, e.g., in the ascending order of physical stripes having valid logical addresses, by using another area of the main memory 22 (Step S23). By this sorting, a copy of the sorted address translation table (hereinafter referred to simply as an address translation table) 221' is created. When this sorting is executed, a high-speed sort algorithm, such as "merge-sort" known well, "quick-sort", "shell-sort" or "heap-sort" can be applied.

Then, the controller 11 sets the physical stripe number at the beginning of the entry information of the address translation table 221' (i.e., the stripe number indicating the initial physical stripe) as the initial value of the physical stripe number i that indicates the physical stripe i to be backed up (Step S24). As in Step S4 described above, the controller 11 determines the physical address n of the reference point 51 (FIG. 5) of the mass storage device 3 and sets that physical address n as an initial value of physical address j at which backup is started (Step S25).

Then, the controller 11 updates the physical stripe number k set in the predetermined area of the nonvolatile memory 13 so that the updated physical stripe number k becomes physical stripe number i indicating the physical stripe that is presently designated as the one to be backed up (Step S26). In this Step S26, the controller 11 refers to the address translation table 221' and determines that the not-empty physical stripes succeeding the one indicated by physical stripe number k (=i) should be ruled out from the segment cleaning.

The controller 11 reads out physical stripe i from the disk array 12 and stores it in the I/O buffer 222 of the main memory 22 (Step S27). The controller 11 then picks out one data block corresponding to a valid logical address from the physical stripe i read in the I/O buffer 222, and writes that data block in the mass storage device 3 at the block position specified by physical address j (Step S28). The valid logical address can be searched for in the address translation table 221', using physical stripe number i as a key. After writing the data block in the mass storage device 3, the controller 11 determines whether the write operation has resulted in failure (Step S29). If the write operation has been successfully performed ("NO" in Step S29), the controller 11 writes control information in an empty entry of the control table (Step S30). The control information includes a logical address of the logical block that has been successfully written (backed up) and a physical address (physical block number) j paired with the logical address (Step S30).

The controller 11 increments j by 1 (Step S31). In addition, the controller 11 determines if the logical-address processing has been performed with respect to all logical blocks included in the physical stripe i read in Step S27 (Step S32). If all logical addresses corresponding to the physical stripe i have been processed ("YES" in Step S32), the controller 11 increments physical stripe number i by 1 in order to specify the physical stripe which should be processed next (Step S33). By referring to the address translation table 221' based on the incremented physical stripe number i, the controller 11 determines whether the processing has been completed with respect to all physical stripes registered in the table 221' (Step S34).

If a physical stripe that should be processed is left ("NO" in Step S34), the controller 11 executes the processing that succeeds Step S26 with respect to physical stripe i specified by the physical stripe number i incremented in Step S33. When no physical stripe that should be processed is left ("YES" in Step S34), the controller 11 issues a backup termination notice to the device driver 204 as a hardware interrupt, for example (Step S35). Upon receipt of the backup termination notice from the controller 11, the device driver 204 transmits it to the backup & restoration program 202. The notice is transmitted, for example, as a completion notice sent as a reply to an I/O control request received from the device driver 204 and requesting backup start.

Upon issuance of the backup termination notice, the controller 11 deletes the physical stripe number k from the predetermined area of the nonvolatile memory 13, thereby canceling the partial segment cleaning mode (Step S35a). Then, the controller 11 determines whether the backup has been successfully performed (Step S36). If this is the case, the contents of the control table 223, which are then stored in the main memory 22, are written in the mass storage device 3 from the starting position (Step S37). FIG. 9 shows an example of how the control table 223 is at the time.

In this manner, the modification of the embodiment processes the physical stripes arranged in the ascending order of physical stripe numbers, and thereby backs up only the data corresponding to the valid logical addresses included in the physical stripe. Owing to this feature, the physical stripes subjected to the backup operation are physically consecutive on the disk array 12. Therefore, the modification of the embodiment manages the currently-processed physical stripe i as first physical stripe k, which is the first one of the physically consecutive physical stripes ruled out from the segment cleaning. Using physical stripe k (=i) as a reference, the physical stripes can be easily classified into two sequences: one is a sequence of physical stripes that can be subjected to segment cleaning; and the other is a sequence of physical stripes that should be ruled out from segment cleaning. In other words, according to the modification of the present embodiment, the physical stripes can be easily classified into a sequence of physical stripes that can be subjected to segment cleaning and a sequence of physical stripes that should be ruled out from segment cleaning. As a result, the physical stripe sequence which is on the disk array 12 and which has not yet been backed up can be protected from segment cleaning. In addition, the physical stripe sequence which is made up of physically consecutive stripes on the disk array 12 and which has been backed up can be subjected to segment cleaning even in the period of the backup operation. Hence, an online backup operation is enabled. Like the embodiment described above, the modification enables a high-speed backup operation without any alterations to the file system or the device driver of the disk array apparatus. In the modification, physical stripes arranged in the ascending order of physical stripe numbers are processed. Instead of this, physical stripes arranged in the descending order of physical stripe numbers may be processed. In this case, the largest one of the physical stripe numbers determined by the number of physical stripes included in the disk array 12 is used as the initial value of physical stripe number k. That is, only the physical stripes having greater physical stripe numbers than physical stripe number k are subjected to segment cleaning.

Figure 10:
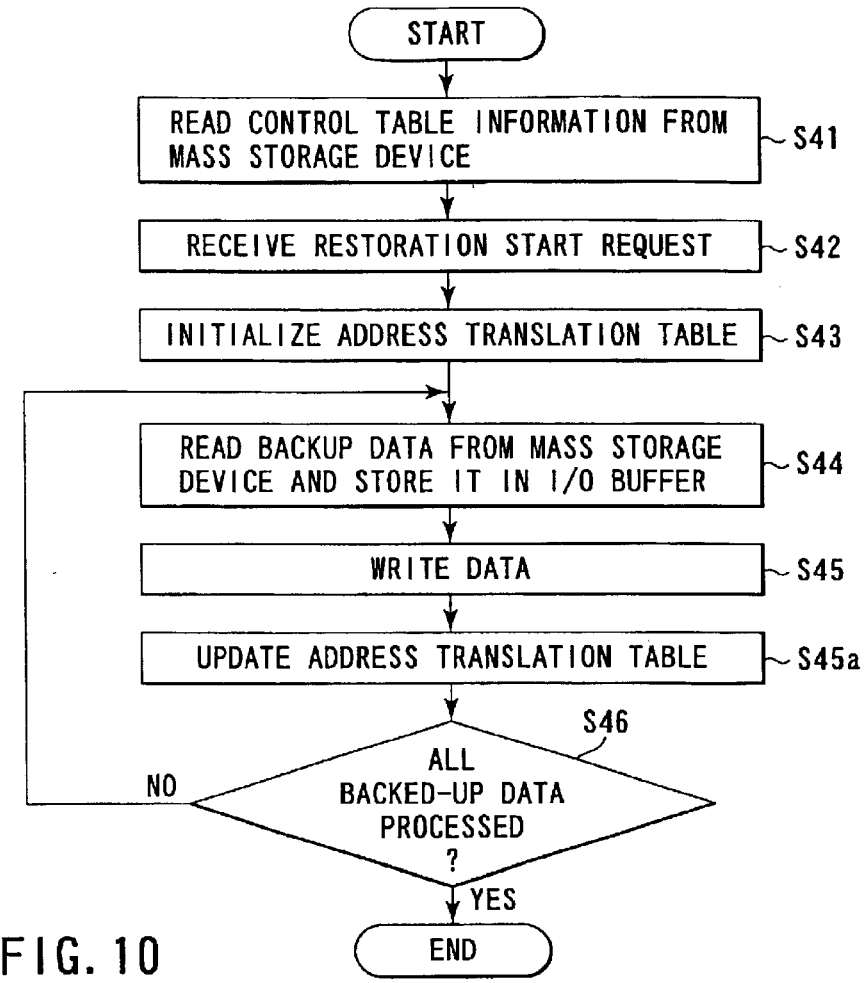
FIG. 10 shows a flowchart illustrating how a restoration operation is executed according to the embodiment.

A description will now be given of the restoration operation with reference to the flowchart shown in FIG. 10. In the restoration operation, the data backed up in the mass storage device 3 is restored in the disk array 12. First of all, the CPU 21 of the host 2 starts running the backup & restoration program 202. Based on this program, the CPU 21 reads out control table information from the mass storage device 3 and stores it in the main memory 22, thereby recovering the control table 223 (Step S41). The control table information is stored in the mass storage device 3, more specifically in the area from physical address "0" to physical address "n−1"

Figures 7C, 9:
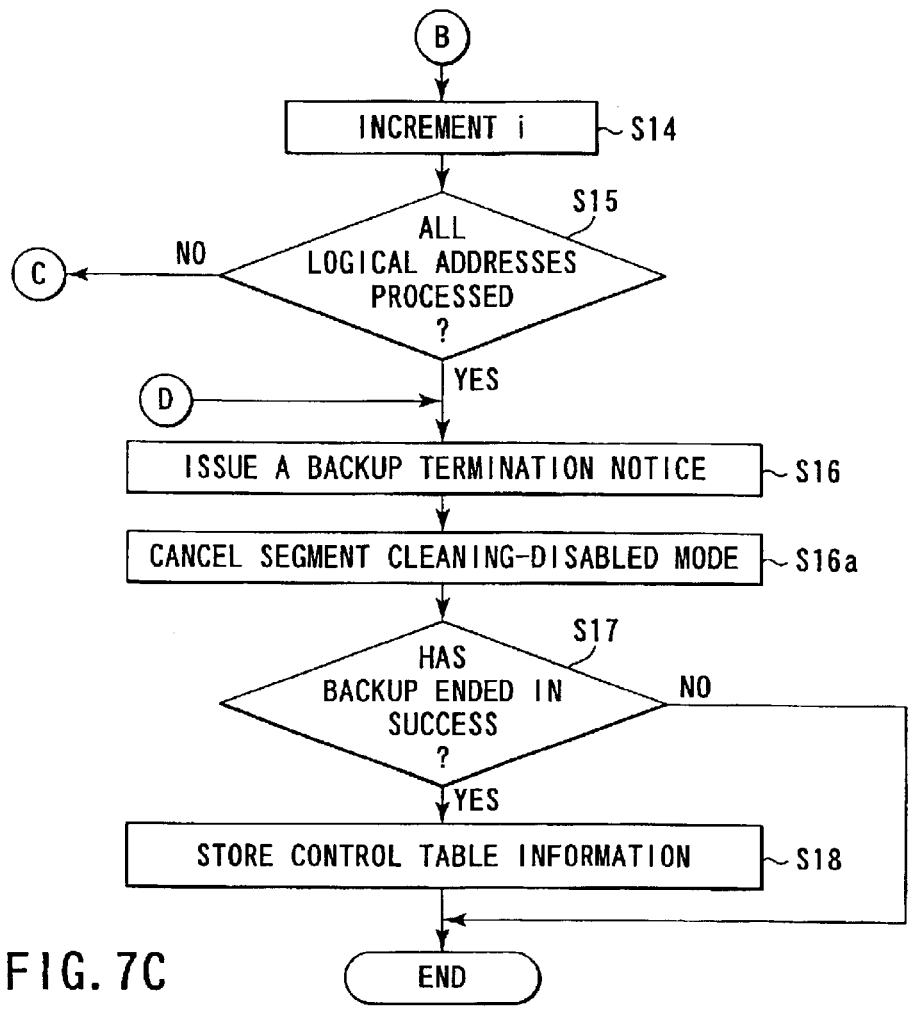
FIG. 9 shows an example of the control table 223.

(in the example shown in FIG. 9, area 52 from physical address "0" to physical address "70"). Owing to this feature, the CPU 21 can read the control table information from the mass storage device 3 at high speed in the order from the starting position of the memory 3.

A restoration start request is issued based on the backup & restoration program 202. This restoration start request can easily be implemented as an I/O control request sent to the device driver 204. Upon receipt of the restoration start request based on the backup & restoration program 202, the device driver 204 transmits it to the disk array apparatus 1. A notice of the restoration start request from the device driver 204 to the disk array apparatus 1 can be easily implemented as a command based on the SCSI standard, for example, a "Mode Select" command.

Upon receipt of the restoration start request from the device driver 204 (Step S42), the controller 11 of the disk array apparatus 1 initializes the address translation table 132 stored in the nonvolatile memory 13 (Step S43). Initialization of the address translation table 132 is carried out by setting "NULL" to the physical stripe number ST#, physical block number BLK# and time stamp TS# corresponding to logical address LA# of each of the entries of the address translation table 132 (NULL clear). In response to the restoration start request received in Step S42, the controller 11 may execute the read processing of reading the control table information in Step S41.

Upon receipt of the restoration start request, the controller 11 reads backup data from the areas that are subsequent to area 52 of the control table information of the mass storage device 3, and sequentially stores the read data in the I/O buffer 222 of the main memory 22 (Step S44). In response to this, the controller 11 executes a write operation of data (as a write process of the controller 11) (Step S45). In this write operation, data is written in the disk array 12 for each physical stripe through the use of the write buffer 131 of the nonvolatile memory 13. The write operation is executed based on the logical addresses (logical block addresses) recorded in the control table 223 and the data stored in the I/O buffer 222. In this write operation, a high-speed write method similar to that described in the prior art documents is used. In the case where the RAID level of the disk array 12 is RAID4, as in the above embodiment, a logical address block is generated each time data read in the I/O buffer 222 is stored in the write buffer 131 in an amount defined by (1 stripe–[1 stripe segment+1 data block]). The generated logical address tag block is stored in the last block location in the write buffer 131. Parity data corresponding to (1 stripe segment) is generated from the data stored in the write buffer 131 and corresponding to (1 stripe–1 stripe segment). The data corresponding to (1 stripe–1 stripe segment) and the generated parity data corresponding to (1 stripe segment) constitute 1-stripe data, and this 1-stripe data is collectively written in the disk array 12.

The controller 11 updates the contents of entries of the address translation table 132 when those entries include logical addresses that specify logical blocks of the stripe written in the disk array 12 (Step S45a). As a result, the physical block number BLK#, physical stripe number ST# and time stamp TS#, which are included in the address translation table 132, are updated in such a manner that the physical block number BLK represents the physical block position of the physical stripe in which logical blocks corresponding to the entries are actually written, the physical stripe number ST# represents the physical stripe itself, and the time stamp represents the latest value. The controller 11 executes these steps, namely steps S44, S45 and S45a, until all data backed up in the mass storage device 3 is processed (Step S46). The write operation of writing data in the disk array for each physical stripe is started from physical stripe "0" (i.e., the physical stripe whose physical stripe number is "0") and continued while simultaneously switching areas into which data is written.

As can be seen from the above, according to the embodiment, segment cleaning is completed at the end of the restoration operation. The information on the entries of the control table 223, which are recovered in the main memory 22 by reading the control table information from the mass storage device 3 in Step S41, may be sorted properly, for example in the ascending order of logical addresses. In this case, the restoration process of backup data is executed in the order of logical addresses. It should therefore be clear that the execution of the restoration process can simultaneously solve the problem of segment fragmentation; in other words, segment defragmentation can be attained simultaneously.

In the restoration operation described above, it may happen that a read request is made based on any one of the application programs other than the backup & restoration program 202, i.e., any one of the application programs 201-1 to 201-n. If this happens, the present embodiment checks whether or not the restoration is completed. If it is completed, the restored data is returned to the requester. If not, an error notice is sent to the requester. On the other hand, it may happen that a write request is made based on any one of the application programs 201-1 to 201-n in the restoration operation. In this case, the following operation is performed. If the restoration is completed, the address translation table 132 is updated in accordance with the requested updating data written in the disk array 12. To the application programs, the updating data appears to have been overwritten on the corresponding restored data. In actuality, however, the updating data is stored in an area different from the area where the corresponding restored data is stored. If the restoration is not completed, the requested updating data is written in the disk array 12. In this case as well, to the application programs, the updating data appears to have been overwritten on the corresponding restored data. When the data to be updated with the updating data is restored in the disk array 12 thereafter, the address translation table 132 is updated in accordance with the restoration.

Figure 11:
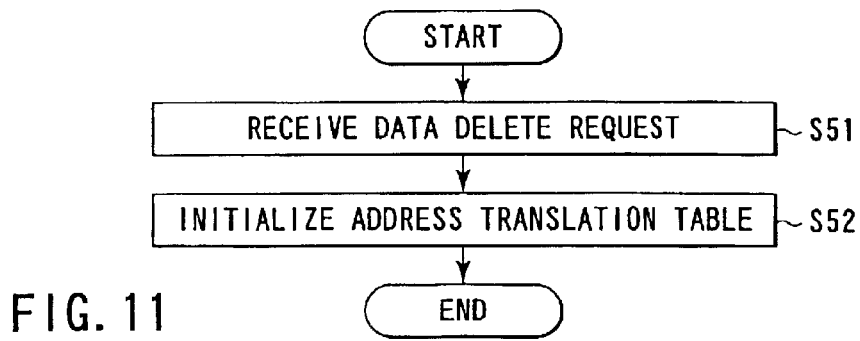
FIG. 11 shows a flowchart illustrating how a data delete operation is executed according to the embodiment.

A description will now be given with reference to the flowchart shown in FIG. 11 as to how a data delete operation is executed according to the present embodiment. First of all, a data delete request intended for the disk array apparatus 1 is issued based on the backup & restoration program 202. This data delete request can be easily implemented as an I/O control request made to the device driver 204. Upon receipt of the data delete request from the backup & restoration program 202, the device driver 204 transmits the corresponding data delete request to the disk array apparatus 1. A notice of the data delete request from the device driver 204 to the disk array apparatus 1 can be easily implemented as a command based on the SCSI standard, for example, a "Mode Select" command.

Upon receipt of the data delete request from the device driver 204 (Step S51), the controller 11 initializes the address translation table 132 of the nonvolatile memory 13 (Step S52). As in Step S43, initialization of the address translation table 132 is carried out by setting "NULL" to the physical stripe number ST#, physical block number BLK# and time stamp TS# corresponding to logical address LA# of each of the entries of the address translation table 132

(NULL clear). The initialization of the address translation table 132 is equivalent to the deletion of data from the disk array 12. The data delete operation described above is an operation executed only on the nonvolatile memory 13. Unlike the conventional data delete operation such as formatting, I/O (input and output) processing for the disk drives 21–23 of the disk array 12 is not needed. Therefore, data can be deleted from the disk array 12 at high speed independently of the memory capacity of the disk array 12. In addition, the data deletion can be executed without depending upon the type of OS or file system, and without depending upon the type of disk drives.

In the above embodiment and its modification, the backup operation and the restoration operation are executed mainly by the controller 11 of the disk array apparatus 1 in response to the backup start request and restoration start request based on the backup & restoration program 202. However, processing based on the backup & restoration program 202 can be executed (by the CPU 21) as long as the processing does not use the write buffer 131 or address translation table 132 arranged in the nonvolatile memory 13 of the disk array 1. The processing that does not use the write buffer 131 or address translation table 132 is, for example, processing using the copy 221 of the address translation table 132 of the main memory 22. Other examples are processing using the I/O buffer 222 or control table 223 of the main memory 22 and input/output processing executed for the mass storage device 3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk array apparatus including a disk array which is made up of a plurality of disk drives, has a redundancy disk configuration, and is regarded as one logical disk drive by a host computer, said disk array apparatus comprising:

an address translation table including address translation information, said address translation information being used for translating a logical address the host computer uses for specifying a valid logical block into a physical address indicating where in the disk array the logical block is stored;

means for making a copy of the address translation table before starting a backup operation, which backs up data stored in the disk array in a mass storage device;

means for searching for a valid logical address in accordance with the copy of the address translation table;

means for reading from the disk array a physical stripe including a data block whose physical address corresponds to the valid logical address searched for by the searching means;

data block writing means for writing in the mass storage device a data block corresponding to a valid logical address included in the physical stripe read by the reading means;

means for storing control information in a control table, said control information including a logical address of the data block the data block writing means writes in the mass storage device, and a physical address representing a physical position at which the data block is stored in the mass storage device;

control information writing means for writing all control information stored in the control table in the mass storage device;

means for restoring the control table based on control information written in the mass storage device when a restoration operation is executed, the restoration operation being for restoring data backed up in the mass storage device in the disk array, wherein said restoring means sorts control information included in the restored control table in an order determined by logical addresses included in the control information;

backup data reading means for reading data backed up in the mass storage device in an order determined by corresponding logical addresses in accordance with the restored control table in which the control information is sorted;

a write buffer which accumulates data to be written in the disk array; and backup data writing means for writing the data the backup data reading means reads from the mass storage device, the data being written in the disk array through the write buffer, said backup data writing means operating each time data read from the mass storage device has been accumulated in the write buffer by a predetermined number of blocks, and writing 1-stripe data, which includes the predetermined number of blocks of data, in the disk array.

2. A disk array apparatus according to claim 1, further comprising:

means for initializing the address translation table before the restoration operation is executed; and means for updating address translation information corresponding to the address translation table with respect to each of logical addresses of logical blocks included in 1-stripe data, each time the 1-stripe data is written in the disk array by the backup data writing means.

3. A disk array apparatus according to claim 1, further comprising:

means for calculating a size of an area the mass storage device requires for writing the control information, based on a size of the address translation table, wherein said data block writing means starts a write operation at a position which is after a starting position of the mass storage device by an area of the calculated size, and said control information writing means starts writing the control information at the starting position of the mass storage device.

4. A disk array apparatus according to claim 1, further comprising:

means for writing data accumulated in the write buffer in the disk array when the backup operation is started; and means for updating the address translation table in accordance with the data accumulated in the write buffer being written in the disk array, wherein said data block writing means makes a copy of the updated address translation table.

5. A disk array apparatus including a disk array which is made up of a plurality of disk drives, has a redundancy disk configuration, and is regarded as one logical disk drive by a host computer, said disk array apparatus comprising:

an address translation table including address translation information, said address translation information being used for translating a logical address the host computer uses for specifying a valid logical block into a physical address indicating where in the disk array the logical block is stored;

means for making a copy of the address translation table before starting a backup operation, which backs up data stored in the disk array in a mass storage device;

means for searching for a valid logical address in accordance with the copy of the address translation table;

means for reading from the disk array a physical stripe including a data block whose physical address corresponds to the valid logical address searched for by the searching means;

data block writing means for writing in the mass storage device a data block corresponding to a valid logical address included in the physical stripe read by the reading means; and means for managing, as a segment cleaning-prohibited physical stripe, only a physical stripe including a data block which the data block writing means has not yet written in the mass storage device.

6. A disk array apparatus including a disk array which is made up of a plurality of disk drives, has a redundancy disk configuration, and is regarded as one logical disk drive by a host computer, said disk array apparatus comprising:

an address translation table including address translation information, said address translation information being used for translating a logical address the host computer uses for specifying a valid logical block into a physical address indicating where in the disk array the logical block is stored;

means for making a copy of the address translation table before starting a backup operation, which backs up data stored in the disk array in a mass storage device;

means for sorting the address translation information included in the copy of the address translation table in an order determined by physical addresses included in the address translation information;

means for reading from the disk array a physical stripe determined by the order of the physical addresses, in accordance with an address translation table in which the address translation information is sorted;

means for managing the physical stripe read by the reading means, as a first physical stripe of physically consecutive physical stripes ruled out from segment cleaning; and data block writing means for writing in the mass storage device a data block corresponding to a valid logical address included in the physical stripe read by the reading means.

7. A disk array apparatus according to claim 6, further comprising:

means for storing control information in a control table, said control information including a logical address of the data block the data block write means writes in the mass storage device, and a physical address representing a physical position at which the data block is stored in the mass storage device;

control information writing means for writing all control information stored in the control table in the mass storage device;

means for restoring the control table based on control information written in the mass storage device when a restoration operation is executed, the restoration operation being for restoring data backed up in the mass storage device in the disk array;

backup data reading means for sequentially reading the data backed up in the mass storage device in accordance with the restored control table;

a write buffer which accumulates data to be written in the disk array; and backup data writing means for writing the data the backup data read means reads from the mass storage device, the data being written in the disk array through the write buffer, said backup data writing means operating each time data read from the mass storage device has been accumulated in the write buffer by a predetermined number of blocks, and writing 1-stripe data, which includes the predetermined number of blocks of data, in the disk array.

8. A disk array apparatus according to claim 7, wherein said restoring means sorts control information included in the restored control table in an order determined by logical addresses included in the control information, and said backup data reading means reads data backed up in the mass storage device in an order determined by corresponding logical addresses in accordance with a sorted control table in which the control information is sorted.

9. A disk array apparatus according to claim 7, further comprising:

means for calculating a size of an area the mass storage device requires for writing the control information, based on a size of the address translation table, wherein said data block writing means starts a write operation at a position which is after a starting position of the mass storage device by an area of the calculated size, and said control information writing means starts writing the control information at the starting position of the mass storage device.

10. A disk array apparatus according to claim 7, further comprising:

means for writing data accumulated in the write buffer in the disk array when the backup operation is started; and means for updating the address translation table in accordance with the data accumulated in the write buffer being written in the disk array, wherein said data block writing means makes a copy of the updated address translation table.

11. A computer system equipped with a host computer including a main memory, a disk array apparatus including a disk array which is made up of a plurality of disk drives, has a redundancy disk configuration, and is regarded as one logical disk drive by a host computer, and a mass storage device in which data of the disk array is backed up, said computer system comprising:

an address translation table including address translation information, said address translation information being used for translating a logical address the host computer uses for specifying a valid logical block into a physical address indicating where in the disk array the logical block is stored, said address translation table being included in the disk array apparatus;

means for generating a copy of the address translation table in response to a backup start request issued by the host computer and keeping the copy in the main memory, said generating means being included in the disk array apparatus;

means for searching for a valid logical address in accordance with the copy of the address translation table, said searching means being included in the host computer;

means for reading from the disk array a physical stripe including a data block whose physical address corresponds to the valid logical address searched for by the searching means, said reading means being included in the host computer;

data block writing means for writing in the mass storage device a data block corresponding to a valid logical address included in the physical stripe read by the reading means, said data block writing means being included in the host computer;

means for storing control information in a control table, said control information including a logical address of the data block the data block writing means writes in the mass storage device, and a physical address representing a physical position at which the data block is stored in the mass storage device, said storing means being included in the host computer;

control information writing means for writing all control information stored in the control table in the mass storage device, said control information writing means being included in the host computer;

means for restoring the control table based on control information written in the mass storage device when a restoration operation is executed, the restoration operation being for restoring data backed up in the mass storage device in the disk array, said restoring means being included in the host computer;

means for initializing the address translation table in response to a restoration start request issued by the host computer, said initializing means being included in the disk array apparatus;

backup data reading means for sequentially reading the data backed up in the mass storage device in accordance with the restored control table after the address translation table is initialized, said backup data reading means being included in the host computer;

a write buffer which accumulates data to be written in the disk array, said write buffer being included in the disk array;

backup data writing means for writing the data the backup data reading means reads from the mass storage device, the data being written in the disk array through the write buffer, said backup data writing means being included in the disk array apparatus, operating each time data read from the mass storage device has been accumulated in the write buffer by a predetermined number of blocks, and writing 1-stripe data, which includes the predetermined number of blocks of data, in the disk array; and means for updating address translation information corresponding to the address translation table with respect to each of logical addresses of logical blocks included in 1-stripe data, each time the 1-stripe data is written in the disk array by the backup data writing means, said updating means being included in the disk array apparatus.

12. A method for backing up data in a mass storage device from a disk array which is made up of a plurality of disk drives, has a redundancy disk configuration, and is regarded as one logical disk drive by a host computer, said method comprising:

making a copy of an address translation table including address translation information before starting a backup operation, which backs up the data stored in the disk array in the mass storage device, said address translation information being used for translating a logical address the host computer uses for specifying a valid logical block into a physical address indicating where in the disk array the logical block is stored;

searching for a valid logical address in accordance with the copy of the address translation table;

reading from the disk array a physical stripe including a data block whose physical address corresponds to the valid logical address that is searched for;

writing in the mass storage device a data block corresponding to a valid logical address included in the read physical stripe;

storing control information in a control table, said control information including a logical address of the data block written in the mass storage device, and a physical address representing a physical position at which the data block is stored in the mass storage device;

writing all control information stored in the control table in the mass storage device;

restoring the control table based on control information written in the mass storage device when a restoration operation is executed, the restoration operation being for restoring data backed up in the mass storage device in the disk array;

sequentially reading the data backed up in the mass storage device in accordance with the restored control table; and writing the data read from the mass storage device in the disk array through a write buffer, the data being written in the disk array in units of 1-stripe data including a predetermined number of blocks each time data read from the mass storage device has been accumulated in the write buffer by said predetermined number of blocks.

13. A method for backing up data in a mass storage device from a disk array which is made up of a plurality of disk drives, has a redundancy disk configuration, and is regarded as one logical disk drive by a host computer, said method comprising:

making a copy of an address translation table including address translation information before starting a backup operation, which backs up the data stored in the disk array in the mass storage device, said address translation information being used for translating a logical address the host computer uses for specifying a valid logical block into a physical address indicating where in the disk array the logical block is stored;

sorting the address translation information included in the copy of the address translation table in an order determined by physical addresses included in the address translation information;

reading from the disk array a physical stripe determined by the order of the physical addresses, in accordance with an address translation table in which the address translation information is sorted;

managing a physical stripe which is to be read in said reading, as a first physical stripe of physically consecutive physical stripes ruled out from segment cleaning; and writing in the mass storage device a data block corresponding to a valid logical address included in the read physical stripe.

14. A method according to claim 13, further comprising:

storing control information in a control table, said control information including a logical address of the data block written in the mass storage device, and a physical address representing a physical position at which the data block is stored in the mass storage device;

writing all control information stored in the control table in the mass storage device;

restoring the control table based on control information written in the mass storage device when a restoration operation is executed, the restoration operation being for restoring data backed up in the mass storage device in the disk array;

sequentially reading the data backed up in the mass storage device in accordance with the restored control table; and writing the data read from the mass storage device in the disk array through a write buffer, the data being written in the disk array in units of 1-stripe data including a predetermined number of blocks each time data read from the mass storage device has been accumulated in the write buffer by said predetermined number of blocks.

* * * * *